United States Patent
Cazenave

(10) Patent No.: US 11,530,680 B2
(45) Date of Patent: Dec. 20, 2022

(54) INSTALLING WIND TURBINE BLADES ON HUBS

(71) Applicant: General Electric Renovables Espana, S.L., Barcelona (ES)

(72) Inventor: Vincent Cazenave, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/069,015

(22) Filed: Oct. 13, 2020

(65) Prior Publication Data

US 2021/0108610 A1    Apr. 15, 2021

(30) Foreign Application Priority Data

Oct. 14, 2019 (EP) ..................... 19203123

(51) Int. Cl.
*F03D 1/06* (2006.01)
*F03D 80/70* (2016.01)

(52) U.S. Cl.
CPC .......... *F03D 1/0658* (2013.01); *F03D 80/70* (2016.05); *F05B 2230/60* (2013.01); *F05B 2240/221* (2013.01); *F05B 2240/30* (2013.01); *F05B 2240/50* (2013.01); *F05B 2260/301* (2013.01); *F05B 2260/964* (2013.01)

(58) Field of Classification Search
CPC ................................... F03D 1/0658
See application file for complete search history.

(56) References Cited

U.S. PATENT DOCUMENTS 10,844,840 B2 * 11/2020 Botwright ............... F03D 13/10

FOREIGN PATENT DOCUMENTS

| EP | 2 538 073 A2 | 12/2012 |
| EP | 2 669 238 A1 | 12/2013 |
| EP | 3 091 223 A1 | 11/2016 |
| WO | WO 2018/113883 A1 | 6/2018 |
| WO | WO 2019/047195 A1 | 3/2019 |

OTHER PUBLICATIONS

EPO Search Report, dated Apr. 24, 2020.

* cited by examiner

*Primary Examiner* — Igor Kershteyn
*Assistant Examiner* — John S Hunter, Jr.
(74) *Attorney, Agent, or Firm* — Dority & Manning, P.A.

(57) ABSTRACT

Methods for installing a wind turbine blade on a wind turbine hub include hoisting the wind turbine blade towards the wind turbine hub; bringing the wind turbine blade and the wind turbine hub into contact through an adaptable resilient body such that the adaptable resilient body is compressed between the wind turbine blade and the wind turbine hub; reducing a dimension of the adaptable resilient body such that the wind turbine blade approaches the wind turbine hub; and mounting the wind turbine blade to the wind turbine hub. Also, assemblies for assisting in mounting the wind turbine blade to the wind turbine hub and adapted wind turbine hubs are provided.

2 Claims, 9 Drawing Sheets

INSTALLING WIND TURBINE BLADES ON HUBS

The present disclosure relates to methods for installing wind turbine blades on a wind turbine hub. The present disclosure also relates to assembly for assisting in the mounting of a wind turbine blade on a wind turbine hub. And the present disclosure also relates to wind turbine hubs that are adapted for a process of installing a wind turbine blade on a hub.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

The installation of wind turbine blades has become more and more of a challenging task due to the general tendency to increase the size and weight of modern wind turbines. Blades of modern wind turbines may be more than 70 or 80 meters, or even more than 100 meters long. During installation, the wind turbine blades may be hoisted towards the rotor hub.

A known way of mounting a wind turbine includes the steps of transporting the different elements to the site of the wind turbine, assembling the tower sections and the tower, lifting the wind turbine nacelle with a large crane and mounting the nacelle on top of the tower. Then the wind turbine rotor hub can be lifted with the crane and mounted to a rotor shaft and/or the nacelle. Alternatively, the hub can be mounted to the nacelle and then the nacelle-hub assembly can be hoisted.

Afterwards, one or more blades are mounted to the wind turbine rotor hub. The rotor hub generally comprises a plurality of annular mounting flanges. Pitch bearings can be arranged with the mounting flanges. The blade can comprise a plurality of fasteners, such as bolts, or pins or studs at its blade root. During installation, these fasteners are to be fitted into openings in the mounting flange or pitch bearing on the hub.

It is also known to hoist a complete rotor assembly, i.e. the hub with the plurality of blades, and mount it to e.g. the nacelle. But in order to mount a complete rotor assembly, a large surface area is required, which is typically not available e.g. in the case of offshore wind turbines.

It is further known to mount an incomplete rotor assembly on the nacelle, e.g. the hub with two blades and subsequently, mount the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these operations, the prevailing wind speed has to be below a predetermined value for a prolonged period time. The period of time depends on the expected length of the installation step and a safety factor to be taken into account.

As mentioned before, blades can be mounted individually as well. It is known to mount each of the plurality of blades substantially horizontally (e.g. $-30°$-$+30°$ with respect to a horizontal plane) or substantially vertically. This means that individual installation steps may require less time and may be performed at higher winds, thus increasing the time windows available for installation.

Wind is inherently variable and winds from different directions, turbulent winds, and wind gusts can act on the wind turbine blade during hoisting and may provoke sudden movements and possibly oscillations of the blade during the hoisting operation. Fitting the blade to a hub may thus be complicated and time-consuming.

For offshore installations, the installation can be even more complicated. The vessel carrying a crane may move under wind and wave forces. Also the wind turbine tower and the nacelle mounted on top of the tower can move under wind and wave forces.

Wind turbine farms may also be situated in remote sites, e.g. on hill-tops and typically in these places the lifting of the wind turbine blade may be subject to high winds.

Frequently difficulties can arise during the lifting operation due to oscillations. In order to perform the installation of the blade, manual aid is often required. This can lead to an increase of the risk for the operator.

The oscillation during hoisting operation may also lead to possible damage to the wind turbine blade or to other parts of the wind turbine. If for example a sudden movement occurs when a wind turbine blade is close to the hub, parts or components may be damaged e.g. the blade, a pitch bearing, blade fasteners.

In order to reduce oscillations of blades during hoisting and installation, the use of tagline systems is known, i.e. control ropes from a vessel or crane that are tied to a blade to prevent oscillations. However they may not completely prevent movements and blade oscillations caused by the wind.

The present disclosure provides examples of methods and tools that at least partially resolve some of the aforementioned disadvantages.

SUMMARY

In one aspect, a method for installing a wind turbine blade on a wind turbine hub is provided. The method comprises hoisting a blade towards the hub, and bringing the blade and the hub into contact through an adaptable resilient body such that the adaptable resilient body is compressed between the blade and the hub. The method further comprises reducing a dimension of the adaptable resilient body such that the blade approaches the hub and mounting the blade to the hub.

In accordance with this aspect, an adaptable resilient body can serve to absorb an impact in case of a sudden movement of a blade at it is hoisted towards the hub. Once contact has been made with the resilient body, the size of the body (in at least one dimension) may be reduced such that the blade approaches the hub. During this procedure the resilient body is compressed to an extent between the blade and the hub and thus supports the blade with respect to the hub and serves to absorb relative movements between hub or nacelle and blade. Such relative movement may be due to e.g. gusts of wind or wave impact in the case of offshore installation. Once the blade has sufficiently approached the hub, the blade can be mounted to the hub.

Resilient as used herein may be particularly understood as a property of a material or body to recoil or spring back into shape after bending, stretching, or being compressed. The term "resilient body" should be understood to cover bodies that are substantially flexible, or elastic. The resiliency of the body makes it possible for the body to absorb shocks or impacts while maintaining its structural integrity as well as the structural integrity of blade and hub.

And adaptable as used herein may be particularly understood as the ability of the body to change, shape, size, volume or position. Adaptable should be understood as covering e.g. pliable, variable, transformable.

In a further aspect, an assembly for assisting in mounting a wind turbine blade to a wind turbine hub is provided. The assembly comprises one or more shock absorbers having a body with a proximal end for mounting to one of the blades and the hub, and a contact surface for contacting the other of the blade and the hub. The body is configured to change a distance between the contact surface and the proximal end.

"Shock absorber" as used throughout the present disclosure should be regarded as any structure that because of material properties, structure, or shape has some flexibility or resiliency and thereby allows absorption of impacts, shocks, oscillations, vibrations and relative movements of the blade with respect to the hub.

In yet a further aspect, a wind turbine rotor hub comprising a mounting surface for mounting a wind turbine blade, a support plate, and a shock absorber mounted on the support plate is provided. The shock absorber is configured to change between a retracted configuration in which the shock absorber does not protrude beyond the mounting surface and a deployed configuration in which the shock absorber protrudes beyond the mounting surface.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
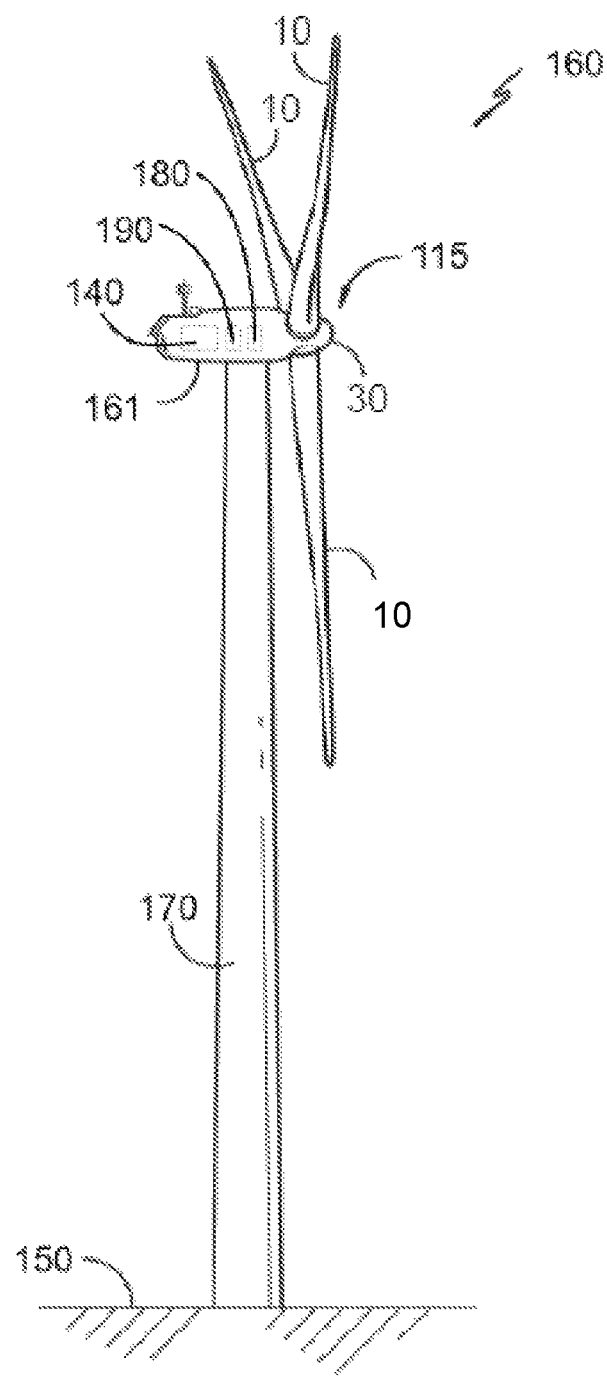
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated example, the rotor 115 includes three rotor blades 120. However, in an alternative embodiment, the rotor 115 may include more or less than three rotor blades 120. Each rotor blade 120 may be spaced from the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 or forming part of the nacelle to permit electrical energy to be produced.

The wind turbine 160 may also include a wind turbine controller 180 centrally located within the nacelle 161. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

Furthermore, the wind turbine 160 may comprise a pitch system 107 for adjusting a blade pitch. Alternatively, the auxiliary drive system may comprise a yaw system 20 for rotating the nacelle 161 with the respect to the tower around a rotational axis. Details of both examples of auxiliary drive systems will be provided in the following. The dedicated controller 190 may be centrally located within the nacelle 161. However, in other examples, the dedicated controller 190 may be located within any other component of the wind turbine 160 or at a location outside the wind turbine. The dedicated controller 190 may control a single auxiliary drive system or alternatively at least two of them.

The wind turbine 160 of FIG. 1 may be placed in an offshore or onshore location.

The wind turbine controller (or "central control system") 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g. loads, wind speed, wind direction, turbulence failure of a component and other.

The wind turbine controller may also include a communications module to facilitate communications between the controller and the components of the wind turbine and their individual control systems. I.e. the wind turbine controller may in operation communicate with a pitch control system, a yaw control system, a converter control system and other controls and components.

Further, the communications module may include a sensor interface (e.g., one or more analog-to-digital converters) to permit signals transmitted from one or more sensors to be converted into signals that can be understood and processed by the processors. It should be appreciated that the sensors may be communicatively coupled to the communications module using any suitable means as for example a wired connection or a wireless connection. As such, the processor may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

Figure 2:
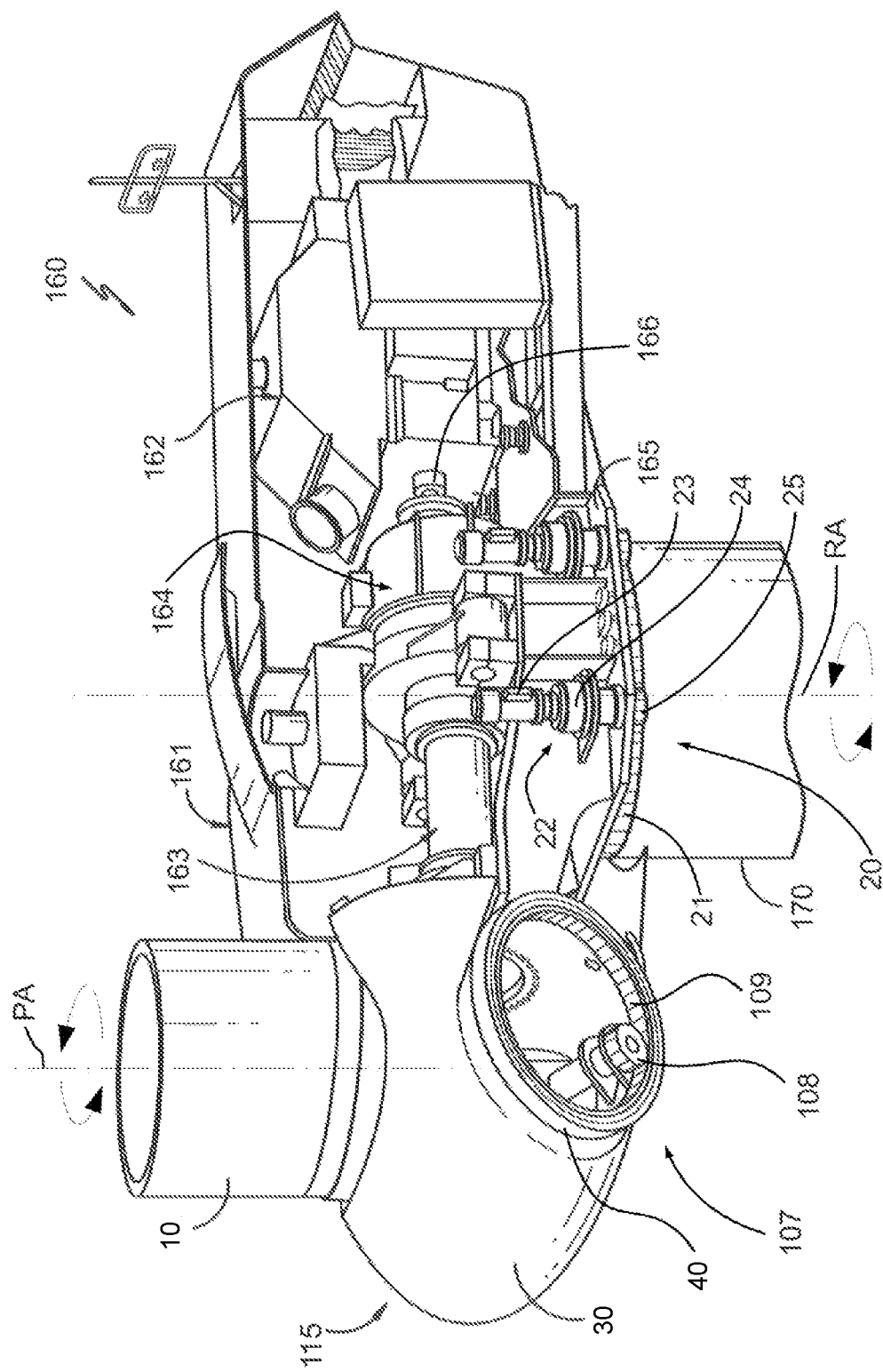
FIG. 2 illustrates a simplified, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a rotating axis or "yaw axis" RA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring (shown in FIG. 2). A wind turbine blade may be attached either at the inner bearing ring or at the outer bearing ring, whereas the hub is connected at the other. A blade 120 may perform a relative rotational movement with respect to the hub 110 when the pitch system 107 is actuated. The rotational movement is performed around a pitch axis PA and thus can be measured in degrees as will be further detailed in conjunction with FIG. 3. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation.

Even though the pitch axis is shown for only a single blade, it should be clear that each of the blades has such a pitch axis. And a single pitch system or a plurality of individual pitch systems may be used to rotate the blade around their longitudinal axes.

Figure 3A:
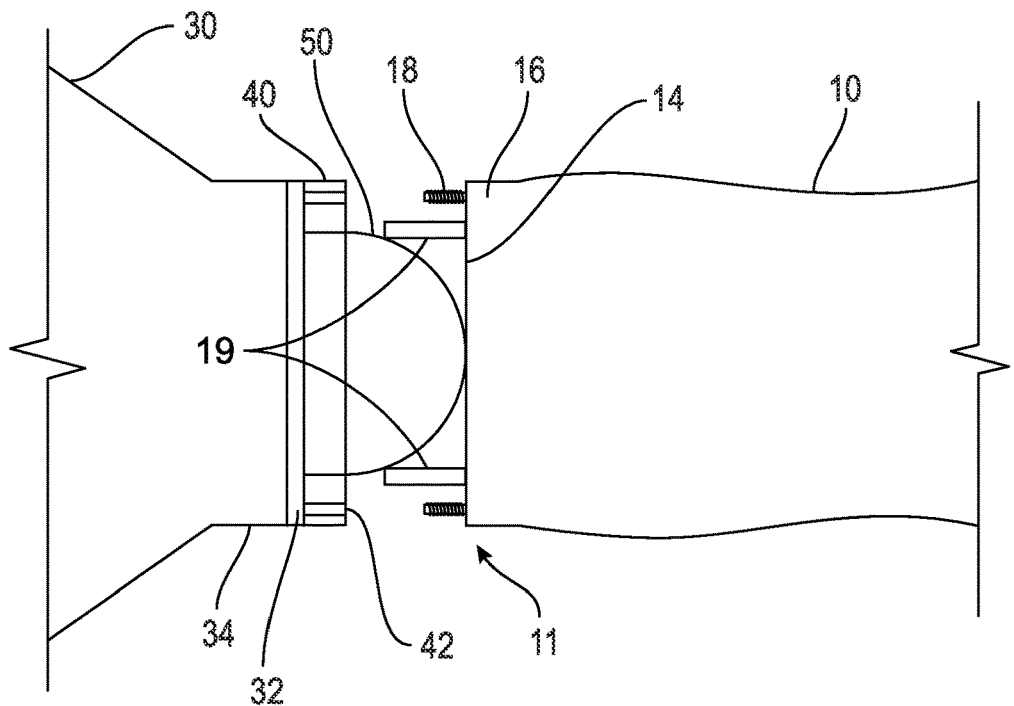
FIGS. 3A-3C illustrate an example of a method for mounting a wind turbine blade to a wind turbine hub.
Figure 3B:
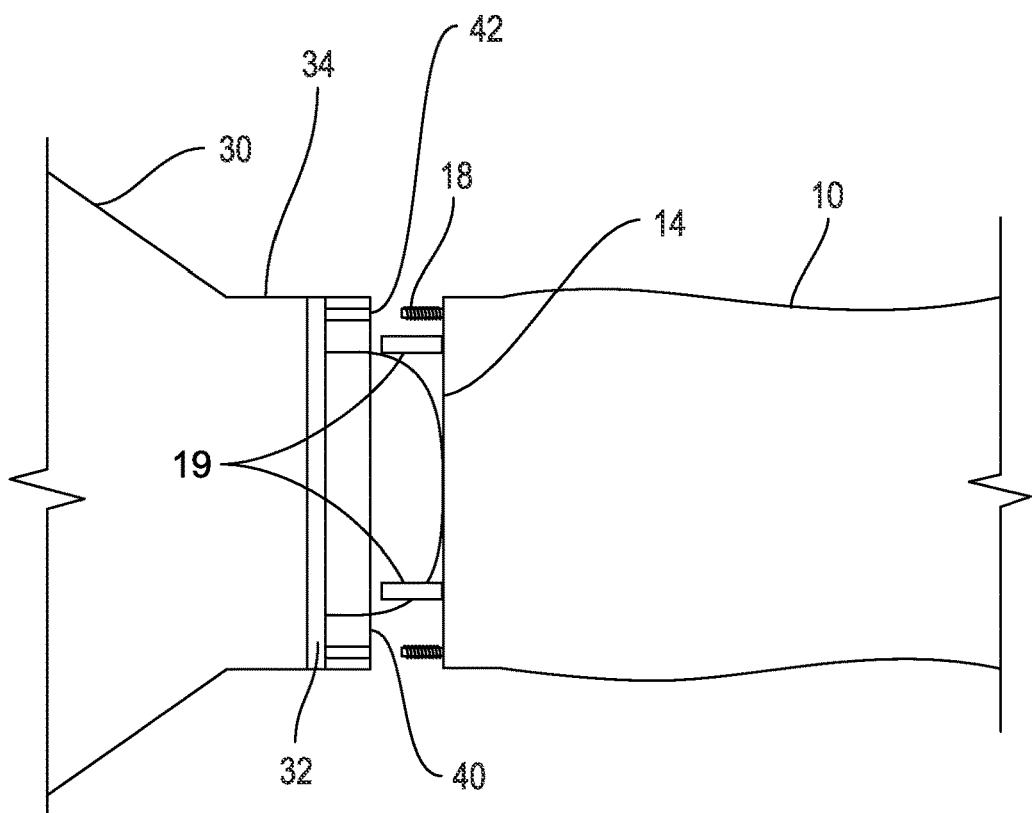
Figure 3C:
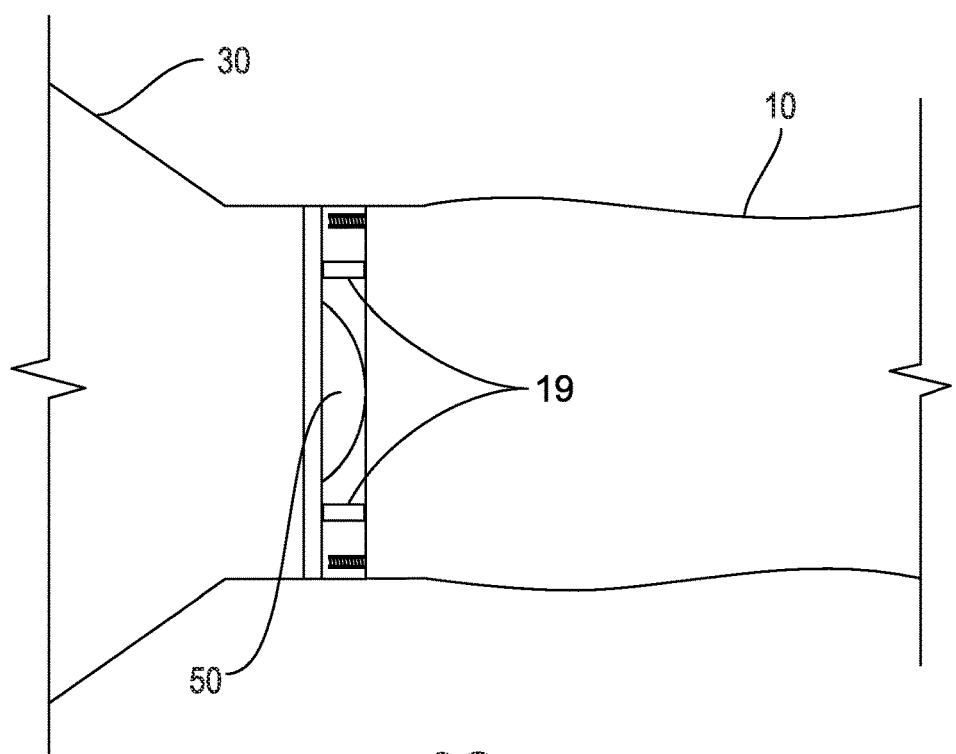

FIGS. 3A-3C illustrate an example of a method for mounting a wind turbine blade to a wind turbine hub.

In accordance with an aspect, a method for installing a wind turbine blade 10 on a wind turbine hub 30. The method comprises hoisting a blade 10 towards the hub 30. Then, the blade 10 and the hub 30 are brought into contact through an adaptable resilient body 50 such that the adaptable resilient body 50 is compressed between the blade and the hub.

FIG. 3A illustrates a situation in which the blade and the hub have just made contact. Then, a dimension of the adaptable resilient body 50 is reduced such that the blade approaches the hub. This is illustrated schematically in FIG. 3B. Then the blade may be mounted to the hub 30.

The body in this example and in other examples may be adaptable particularly in a controlled or active manner, i.e. actuators may be activated and/or controlled such that the blade can approach the hub in a controlled fashion.

In some examples, like in the example of FIG. 3, the adaptable resilient body may be mounted on the hub 30. In this example, hub 30 has a mounting flange 34. A pitch bearing 40 is mounted on flange 34. The adaptable resilient body 50 is mounted on a support plate 32. The support plate 32 may be a pitch carrier plate carrying a pitch mechanism. Specifically, the pitch carrier plate may support a motor and gearbox assembly which are configured to drive a pinion. The pinion may engage with an annular gear for pitching the blade i.e. for rotating the blade around its longitudinal axis. The annular gear may be arranged with the blade or with the pitch bearing.

The support plate, or pitch carrier plate 32 may be integrally formed with the hub. Alternatively, the pitch carrier plate 32 may be arranged between the hub and the pitch bearing.

The pitch bearing may include an inner bearing ring and an outer bearing ring with one or more rows of rolling elements in between the rings. The rolling elements may be e.g. balls or cylindrical rollers.

One of the bearing rings may be fixedly mounted to the hub, and the other bearing ring may be fixedly mounted to the blade. With this arrangement, the blade can rotate with respect to the hub.

The bearing ring that is to be fixed to the blade may have a plurality of holes 42 (for clarity purposes only two holes are shown). Before hoisting a blade towards the hub, the hub may carry the pitch bearing.

The blade 10 may include a mounting flange 16 at the blade root 11. The flange 16 of the blade may carry a plurality of fasteners 18 which are adapted to mate with holes 42. The fasteners may be e.g. pins, bolts or studs. The adaptable resilient body 50 may function as a shock absorber and may be arranged on the pitch carrier plate 32. The blade 10 may carry a bulkhead 14 at or near blade root 11. The body 50 may be compressed between bulkhead 14 and pitch carrier plate 32 as the blade is brought towards the hub.

In some cases, aligning and/or orienting the blade with respect to the hub may take place when the adaptable resilient body is compressed between the blade and the hub. The resilient body 50 may act as support for the blade.

Mounting the blade to the hub may comprise introducing a plurality of fasteners on the blade into holes of a pitch bearing mounted on the hub. This is schematically illustrated in FIG. 3C.

In some examples, one or more of the plurality of fasteners are guiding fasteners 19 that are longer than other fasteners of the plurality of fasteners, and one of the guiding fasteners 19 is introduced into a corresponding hole on the pitch bearing first. A guiding pin may be larger than the other fasteners and therefore be introduced into a corresponding hole on the hub. Once these guiding pins have been introduced, then the blade is properly oriented with respect to the hub.

In some examples, a dimension of the adaptable resilient body may be further reduced after at least one or more of the fasteners on the blade has been introduced into the holes on the pitch bearing of the hub. The remainder of the fasteners may then be introduced. That is, in some examples, the adaptable resilient body when in its fully inflated or deployed state avoids any contact between the fasteners and the hub, including possible longer guiding fasteners 19. Then, a first reduction of the resilient body may be performed to bring the guiding fasteners 19 closer and be able to introduce them into corresponding holes. After these guiding fasteners 19 have been introduced, a further reduction of at least one dimension of the adaptable resilient body may take place, such that the other fasteners can be attached. Possibly, a further reduction may take place during or after the insertion of the fasteners before removing the adaptable resilient body.

In some examples, hoisting the blade 10 towards the hub 30 may comprises attaching a blade holder to the wind turbine blade and hoisting the blade holder with a crane. Specifically, the blade holder may be configured to hold the blade close to its centre of gravity. The blade holder may be or include a sling. In some examples, the blade holder may be gripping unit that is configured to grip a blade. And in some examples, the gripping unit may include one or more degrees of freedom. For example, the gripping unit may be used to rotate and/or move a blade to align the blade with the hub.

A crane and taglines and the blade holder may be used to control movements of the blade. This applies both before the blade and hub (through the resilient body) make contact, and after they have made contact.

It may be seen in FIG. 3c, that a dimension of body 50 may be reduced to an extent that it does not protrude beyond a mounting surface of the hub to which the blade is mounted.

Once the blade has been mounted, the body 50 may be removed from the pitch carrier plate to which it was mounted. In some examples, the same body 50 be attached to the pitch carrier plate of the subsequent blade to be mounted. The assembly may take place on the ground, and the pitch carrier plate may then be hoisted to the corresponding flange of the hub. In other examples, a plurality of bodies is attached, i.e. at least one for each of the rotor blades.

Figure 4A:
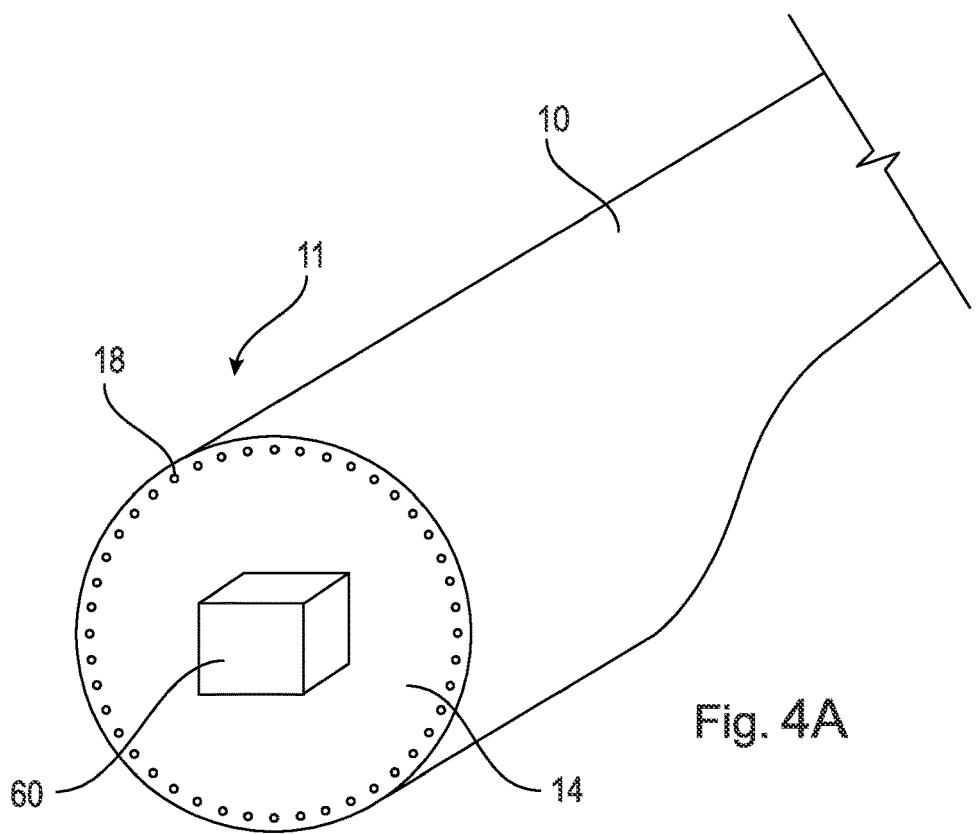
FIGS. 4A and 4B schematically illustrate two examples of wind turbine blades carrying a shock absorber.
Figure 4B:
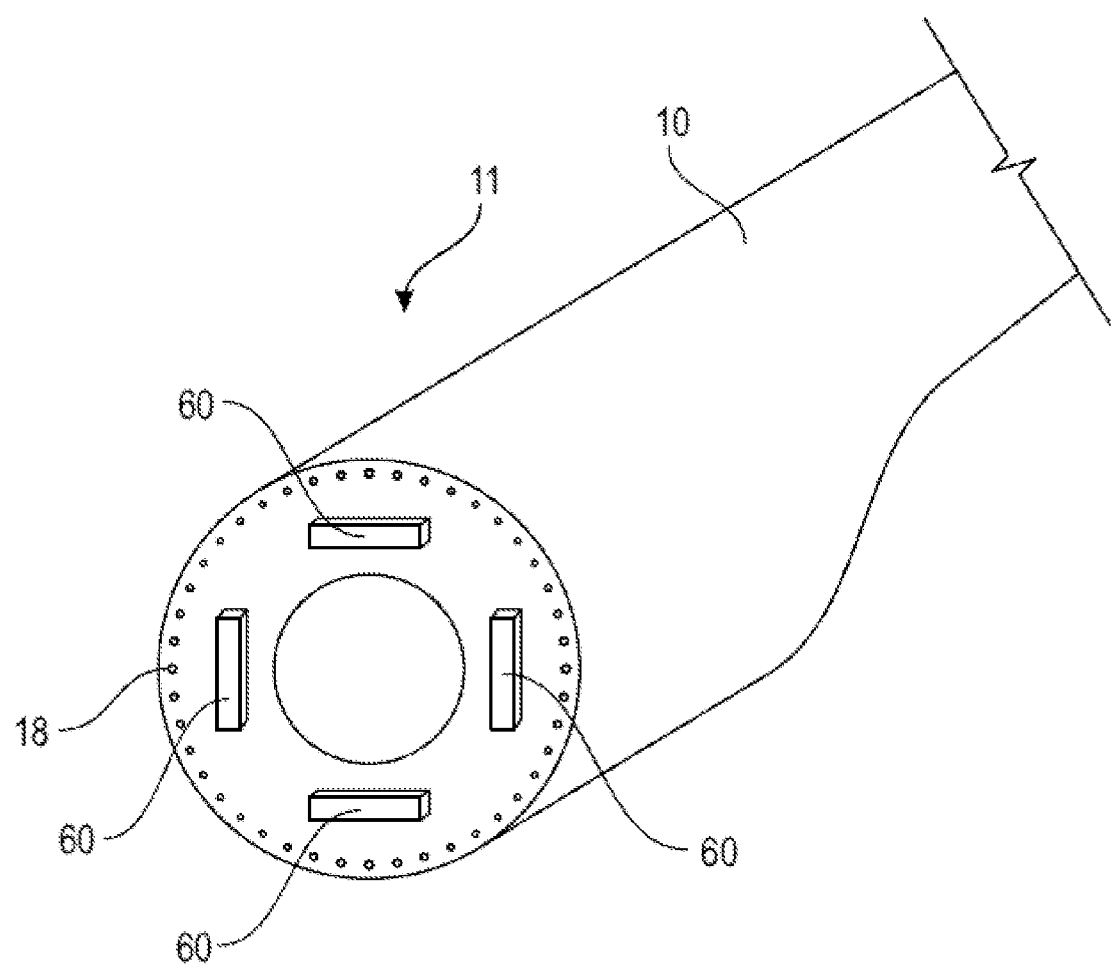

FIGS. 4A and 4B schematically illustrate two examples of wind turbine blades carrying a shock absorber. In an alternative example, one or more resilient bodies 60 or shock absorbers may be mounted to the blade 10, rather than to the hub. Blade 10 may carry a plurality of fasteners 18 at blade root 11. In the example of FIG. 4A, the shock absorber 60 may be mounted on bulkhead 14.

In another example, like FIG. 4B, one or more shock absorbers 60 may be attached to a mounting flange 16 of blade 10. A blade flange 16 may be relatively wide to provide sufficient surface area for mounting the shock absorbers 60.

FIGS. 5A-5E schematically illustrate examples of shock absorbers for use in the installation of wind turbine blades on a hub.

According to an aspect, an assembly for assisting in mounting a wind turbine blade to a wind turbine hub is provided. The assembly comprises one or more shock absorbers 70 having a body with a proximal end 74 for mounting to one of the blade and the hub, and a contact surface 72 for contacting the other of the blade and the hub. The body is configured to change a distance between the contact surface and the proximal end.

In some examples, the body may be expandable. Specifically, the body may be inflatable. In some examples, the assembly may comprise a pneumatic system for inflating and deflating the body of the shock absorber. Such a pneumatic system may be mounted on the hub, or on blade.

Figure 5A:
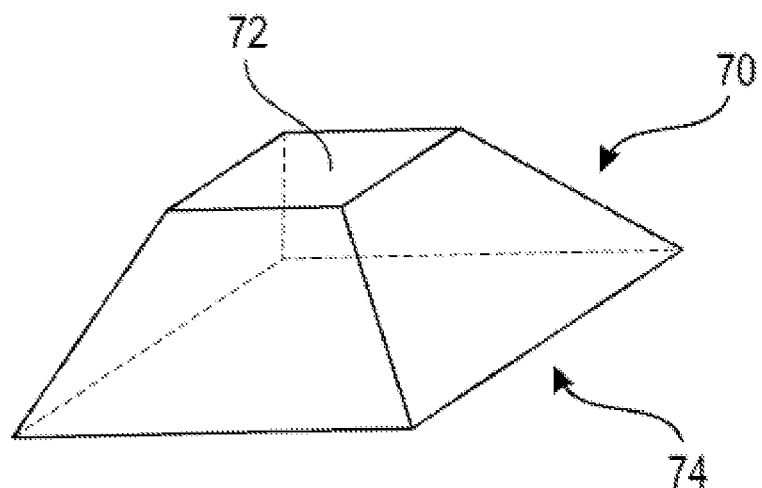
FIGS. 5A-5E schematically illustrate examples of shock absorbers for use in the installation of wind turbine blades on a hub.
Figure 5B:
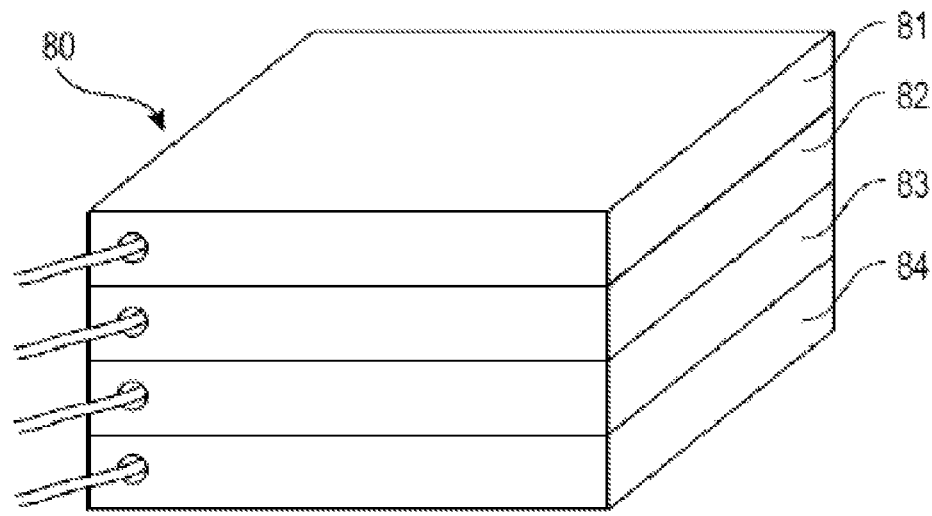

A further example of an inflatable body 80 is shown in FIG. 5B. In the example of FIG. 5B, the body comprises a plurality of compartments 81, 82, 83 and 84 that are individually expandable. Each of the compartments may include a gas supply with a dedicated compressor to provide pressurized air to the compartments.

Figure 5C:
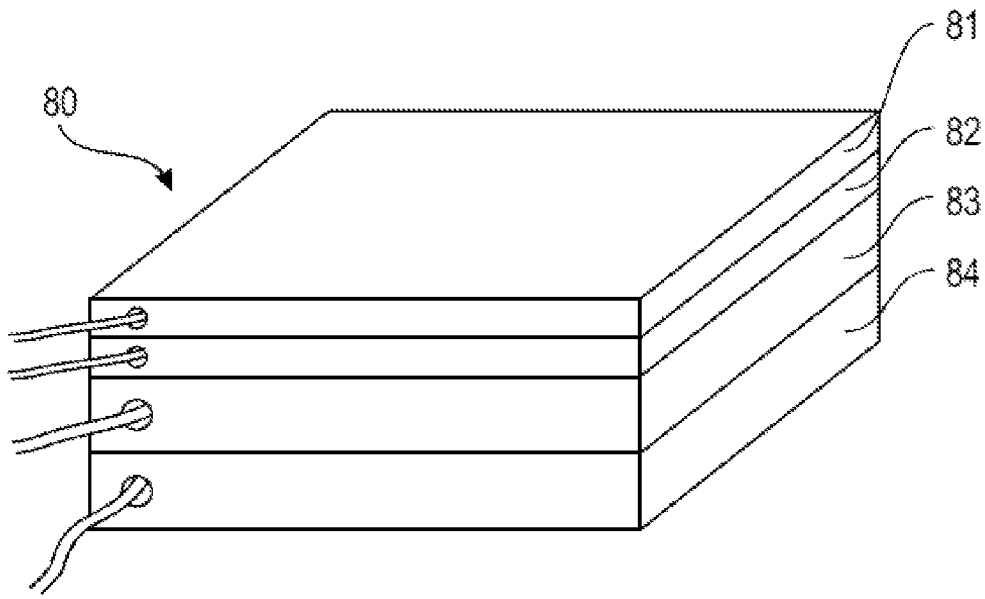

FIG. 5B shows the inflatable body in a fully deployed state. FIG. 5C shows the same inflatable body in which some of the compartments are not inflated anymore. A first contact between blade and hub may be established when the inflatable body is fully deployed. By releasing pressurized air, the height of the inflatable body may be controllably reduced, one compartment after another. The blade may thus be brought closer to the hub.

Figure 5D:
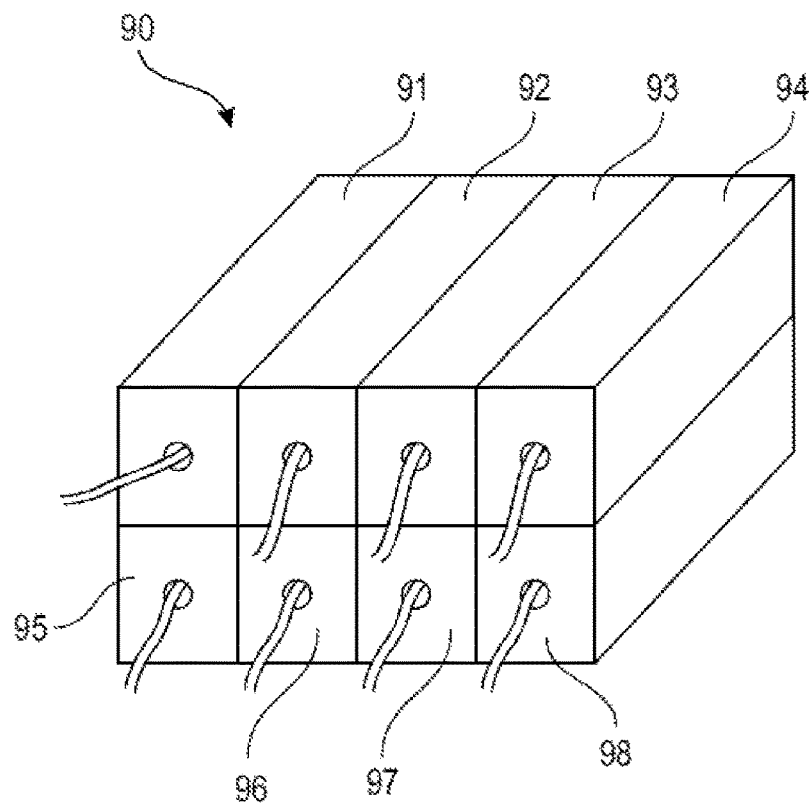
Figure 5E:
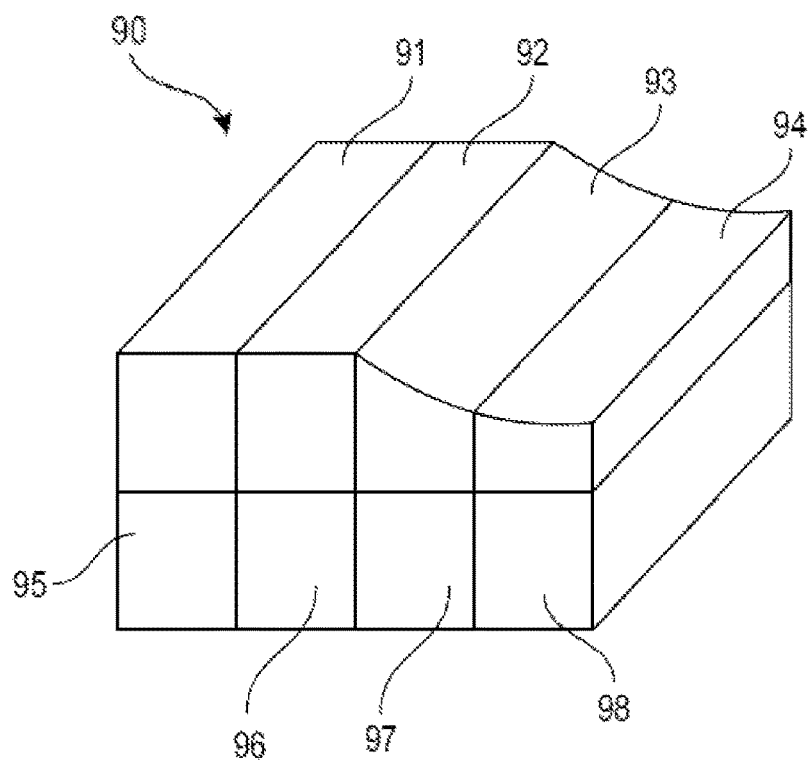

FIG. 5D shows a further inflatable body 90 with a plurality of independent compartments 91-98. In this example, the compartments are not only arranged on top of each other, as in FIGS. 5B and 5C, but also next to each other. By selectively inflating and deflating specific compartments, the shape of the inflatable body 90 may be varied. In a first instance, to absorb a first impact, the body 90 may be fully inflated as in FIG. 5D. Depending on the orientation and position of the blade, selectively compartments may be partly or completely deflated as in FIG. 5E. At the same time, a crane and/or blade holder may be used to force the blade towards the hub. As the size and shape of the body 90 is varied, a corrective movement may be applied to the blade, such that the blade is properly aligned and/or oriented with the hub.

In a further example, an adaptable resilient body such as the inflatable body 90, may comprise compartments in various directions. A first direction has been illustrated e.g. in FIGS. 5B and 5C, in which compartments are stacked on top of each other in a direction substantially along the longitudinal axis of a blade to be mounted. A second direction has been illustrated e.g. in FIGS. 5D and 5E wherein along one direction perpendicular to a longitudinal axis of the blade compartments are provided. In further examples, such compartments may also provided along a further direction perpendicular to the longitudinal axis of the blade to be mounted. E.g. in a mounting plane or in the plane of the pitch carrier, the compartments may be provided along two directions that are perpendicular to each other.

In a further aspect, a wind turbine rotor hub is provided comprising a mounting surface for mounting a wind turbine blade, a support plate, and a shock absorber mounted on the support plate. The shock absorber is configured to change between a retracted configuration in which the shock absorber does not protrude beyond the mounting surface and a deployed configuration in which the shock absorber protrudes beyond the mounting surface.

In some examples, the wind turbine rotor hub may further comprise a pitch bearing and wherein the support plate is arranged between the hub and the pitch bearing.

In some examples, the support plate may be integrally formed with the hub.

In some examples, the shock absorber may have an inflatable body. In some of the examples, the wind turbine rotor hub may further comprise a pneumatic system for inflating and deflating the body of the shock absorber.

Figure 6A:
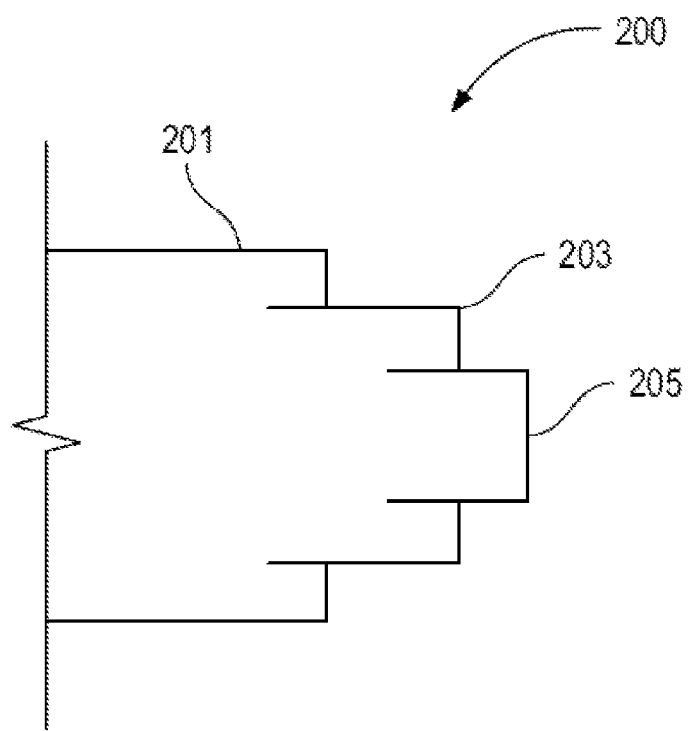
FIGS. 6A and 6B schematically illustrate a further example of a shock absorber in a deployed state and in a folded state.
Figure 6B:
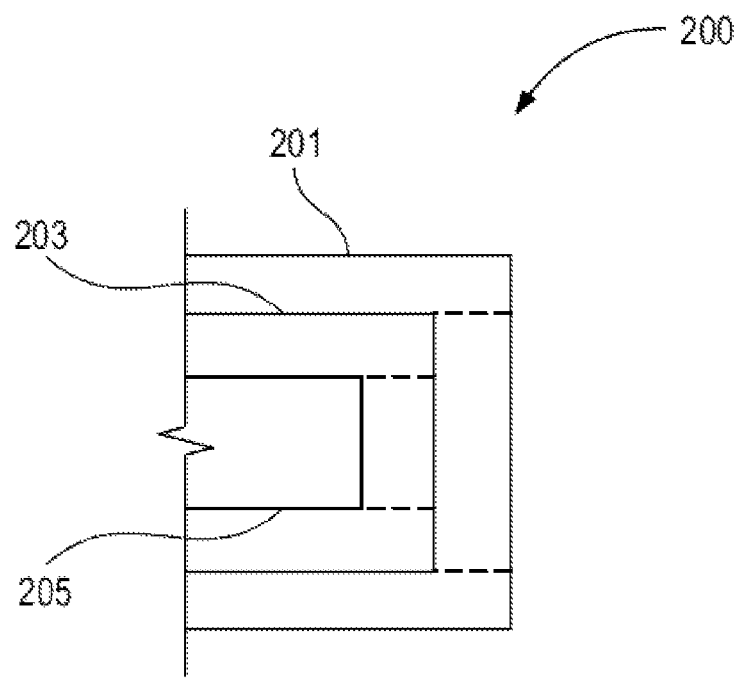

FIGS. 6A and 6B schematically illustrate a further example of a shock absorber in a deployed state and in a folded state. In the examples shown so far, the shock absorbers have been shown to be inflatable or pressurized structures. However, other arrangements are possible. E.g. in FIG. 6A, a telescopic resilient body 200 is shown. Such a resilient body 200 may be mounted e.g. to the hub or to a blade as was shown before.

The shock absorber 200 may include a mounting surface at a proximal end and a resilient distal end 205 to absorb an impact of a hub with a blade. In this particular example, three independent bodies are shown. The base 201 may be attached to e.g. a hub. Intermediate body 203 may slide or otherwise be moved with respect to base 201. The base 201 may include suitable guides. Distal body 205 may perform a similar movement with respect to intermediate body 203. In its deployed state, the shock absorber may protrude beyond a mounting surface of the hub. Once contact has been made with a blade, the height of body 200 may be reduced such that the blade can approach the hub.

In the folded or retracted state, the shock absorber 200 does not protrude beyond a mounting surface of the hub, and the blade can thus be mounted. Transitioning from a retracted state to a deployed state may include inflating (in the case of an inflatable body or shock absorber), unfolding, telescopically extracting, expanding, hydraulic actuation or other.

Figure 7:
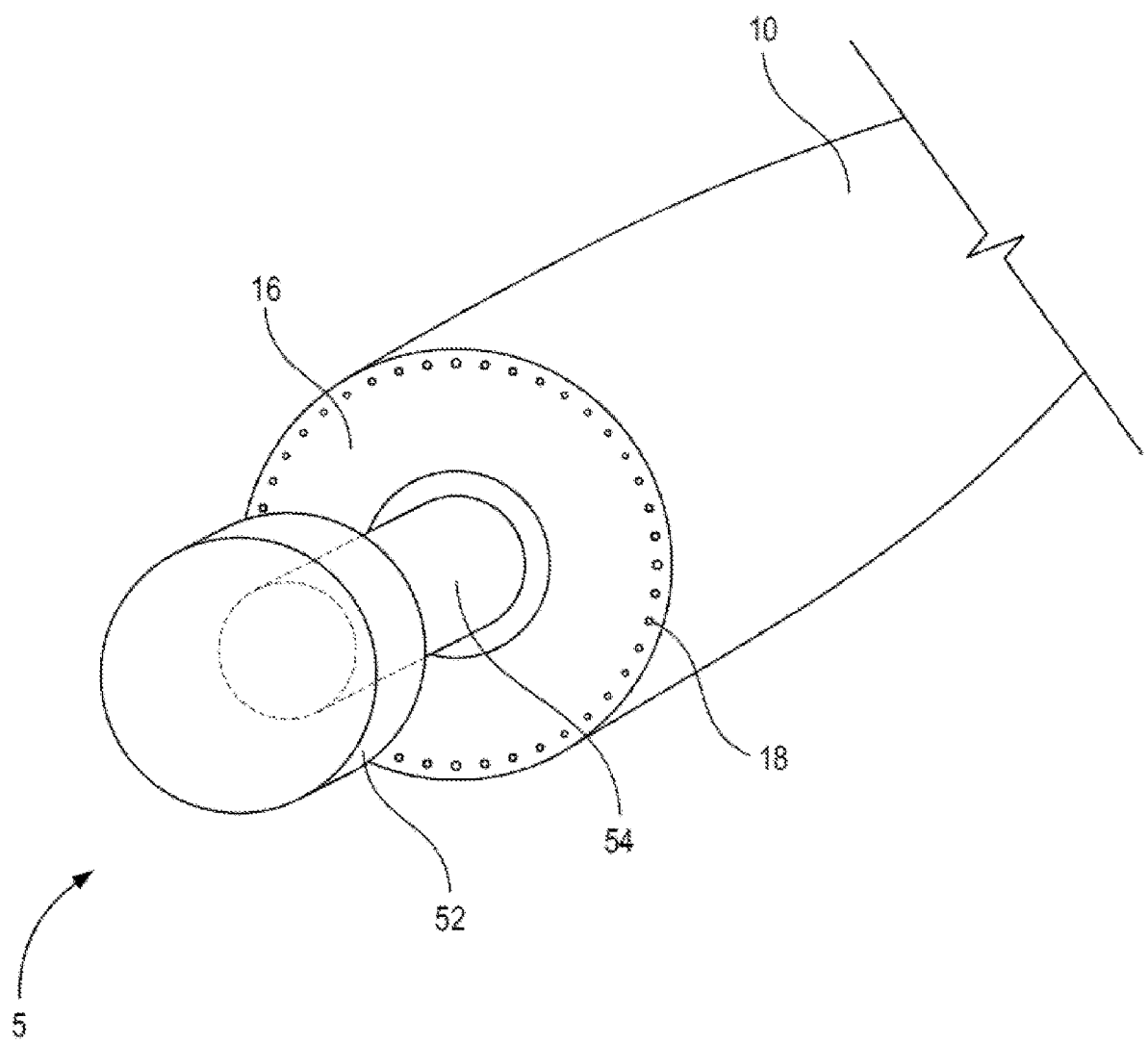
FIG. 7 illustrates yet a further example of a shock absorber that may be mounted on a hub in a process for mounting a wind turbine blade.

FIG. 7 illustrates yet a further example of a shock absorber 5 that may be mounted on a hub in a process for mounting a wind turbine blade. In the example of FIG. 7, the shape of the shock absorber, or at least a part of the shape of the shock absorber may be complementary to a part of the wind turbine blade. A male-female coupling may be established between a part of the shock absorber, e.g. the most distal part and a part of the blade, e.g. an inner edge of a blade flange 16.

In this particular example, the shock absorber may include two separate substantially cylindrical compartments 52 and 54. However, this is merely one possible example.

In further examples, the shock absorber may be mounted on a wind turbine blade and its shape may be adapted to engage with a portion of e.g. the pitch carrier plate.

Male-female couplings as schematically described herein may help in centering a wind turbine blade with respect to the hub.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for installing a wind turbine blade on a wind turbine hub, the method comprising:
    hoisting a wind turbine blade towards the wind turbine hub, the wind turbine blade comprising a plurality of fasteners wherein one or more of the plurality of fasteners are guiding fasteners that are longer than other fasteners of the plurality of fasteners;
    bringing the wind turbine blade and the wind turbine hub into contact through an adaptable resilient body such that the adaptable resilient body is compressed between the wind turbine blade and the wind turbine hub, and such that the plurality of fasteners of the wind turbine blade are not in contact with the wind turbine hub, the adaptable resilient body being inflated;
    reducing a dimension of the adaptable resilient body by deflating the adaptable resilient body such that the wind turbine blade approaches the wind turbine hub, and such that the plurality of fasteners of the wind turbine blade are not in contact with the wind turbine hub;
    aligning the wind turbine blade with respect to the wind turbine hub when the adaptable resilient body is compressed between the wind turbine blade and the wind turbine hub, and when the plurality of fasteners of the wind turbine blade are not in contact with the wind turbine hub;
    deflating the adaptable resilient body such that the guiding fasteners of the plurality of fasteners are in contact with the wind turbine hub; and then
    mounting the wind turbine blade to the wind turbine hub by further deflating the adaptable resilient body such that the other fasteners of the plurality of fasteners are in contact with the wind turbine hub.

2. The method according to claim 1, wherein the adaptable resilient body is mounted on the wind turbine hub.

\* \* \* \* \*